United States Patent [19]

Simoneau et al.

[11] Patent Number: 4,514,615
[45] Date of Patent: Apr. 30, 1985

[54] PROTECTION CIRCUIT AGAINST ELECTRIC SHOCKS DURING WELDING

[75] Inventors: Raynald Simoneau, St. Bruno; Jean-Marc Pelletier, St. Louis de Terrebone; Antonio Di Vincenzo, Ville d'Anjou; Jean-Paul Boillot, Beloeil, all of Canada

[73] Assignee: Hydro-Quebec, Montreal, Canada

[21] Appl. No.: 602,628

[22] Filed: Apr. 23, 1984

Related U.S. Application Data

[63] Continuation of Ser. No. 360,560, Mar. 22, 1982, abandoned.

[30] Foreign Application Priority Data

Dec. 8, 1981 [CA] Canada ................................... 391754

[51] Int. Cl.³ ............................................... B23K 9/10
[52] U.S. Cl. ................................ 219/132; 219/130.21; 219/130.31
[58] Field of Search ............. 219/132, 130.31, 130.32, 219/130.33, 130.21

[56] References Cited

U.S. PATENT DOCUMENTS

| | | | |
|---|---|---|---|
| 2,449,456 | 9/1948 | Croco et al. | 219/130.21 |
| 3,564,294 | 2/1971 | Balchin | 219/130.32 |
| 4,079,231 | 3/1978 | Toth | 219/130.32 |
| 4,100,390 | 7/1978 | Jackson | 219/132 |

FOREIGN PATENT DOCUMENTS

| | | | |
|---|---|---|---|
| 513803 | 6/1976 | U.S.S.R. | 219/130.21 |
| 654365 | 3/1979 | U.S.S.R. | 219/130.21 |

OTHER PUBLICATIONS

F. W. Gutzwiller, ed., *G.E. SCR Manual*, 1967, pp. 145-146.

*Primary Examiner*—Clifford C. Shaw
*Attorney, Agent, or Firm*—Burns, Doane, Swecker & Mathis

[57] ABSTRACT

A circuit for controlling the power supply to an electrode of the shielded type, such as that used in a shielded metal arc welding process (SMAW) whereby to protect a user from electric shocks. The control circuit is a protection circuit which serves to protect welders against electric shocks by decreasing the circuit voltage between the electrode tip and the workpiece to be welded. An AC or DC power supply may be used to feed the electrode. The control circuit is comprised of a high impedance voltage source applied to the electrode, a detection circuit for determining the level value of the impedance appearing between the electrode and the workpiece. The detection circuit compares the impedance thus detected with a threshold impedance and generates a control signal when the detected impedance is lower than the threshold impedance. The control signal operates a driver circuit which energizes a power feed device serially connected between the electrode power supply and the electrode itself. The predetermined threshold impedance value is set at about 500 ohms whereby a wet human body will not be subjected to an electric shock by contacting the electrode and the workpiece simultaneously.

16 Claims, 3 Drawing Figures

VOLTAGE CONTROL add-on CIRCUIT FOR WELDING POWER SUPPLIES

PROTECTION CIRCUIT AGAINST ELECTRIC SHOCKS DURING WELDING

This application is a continuation of application Ser. No. 360,560 filed Mar. 22, 1982, now abandoned.

BACKGROUND OF THE INVENTION

1. Field of the Invention

The present invention relates to a circuit for controlling the power supplied to an electrode of the shielded type as used in an electric arc welder device. These shielded electrodes are well known in the art as being solid flux covered metal electrodes used in shielded metal arc welding process (SMAW). Such a power control protects welders against electric shocks in limiting the open circuit voltage between the electrode and the workpiece to be welded to a safe level.

In welding operations, welders who have to work with electric arc electrodes which require a rather high starting voltage are quite commonly subjected to electric shocks, particularly when the welding operation is effected in a damp environment, such as on hydraulic turbines, in tanks or basins, in water cooling systems, where it is extremely difficult to obtain adequate electric insulation between the welder and the grounded workpiece or electrode holder. It has been observed that electric shocks frequently occur and are strong enough to inflict in the welder a nervous repulsive feeling against electric shocks, although these shocks usually do not result in severe injuries. A feature of the present invention generally resides in eliminating electric shock hazards by controlling the open circuit voltage of the electrode-workpiece assembly, such a voltage corresponding to that necessary for starting the electric arc.

2. Description of Prior Art

It is known that there exists a high probability of electric shocks when the arc starting voltage, usually of about 80 volts, is developing in the open circuit formed between the electrode and the workpiece. When started, the electric arc is maintained burning under a much lower voltage ranging from about 15 to 30 volts. To reduce electric shock hazards associated with high open circuit voltage, there was proposed various types of manually or automatically operated circuits incorporating mechanical contactors, the main function of which was to disconnect the electrode from the power supply when the electric arc was off. However, those mechanical contactors suffer from a major drawback, in that they have a low time response. None of the suggested circuits have ever offered a reliable and efficient answer to the security problems associated with the use of electric arc electrodes. Thus, the prior art circuits have never achieved acceptance among welders.

SUMMARY OF THE INVENTION

Another feature of the present invention is to provide a control circuit wholly made up of electronic components which are of a reliable, efficient and fast operation. The circuit thus provided eliminates the hazards and risk situations related to the existence of a high open circuit voltage and that without disturbing the correct welding operation or process despite a modification in the power supply source due to the use of an add-on control circuit.

A further feature of the present invention is to provide a circuit which is capable of controlling the power supplied to the electrode whether that power is derived from a direct current source or from an alternating current source. Moreover, the control circuit may be adapted to any available power supply or may be inserted in series between the power supply output and the electrode.

According to the above features, from a broad aspect, there is provided a control circuit for controlling the power supply to a shielded electrode of the type used in shielded metal arc welding process (SMAW) whereby to protect the user from electric shocks. The control circuit comprises a measuring device for determining the level value of the dynamic impedance appearing between the electrode and a workpiece. A power feeding device is connected in series between the power supply and the electrode, in normal working conditions. The power feeding device is controlled by the impedance measuring device so as to render the power feeding device conductive when the dynamic impedance value detected by the measuring device is lower than a predetermined threshold impedance value, thereby to supply power to the electrode. This predetermined threshold impedance value is set at about 500 ohms whereby a wet human body will not be subjected to an electrical shock by contacting the electrode and the workpiece simultaneously.

BRIEF DESCRIPTION OF THE DRAWINGS

A preferred embodiment of the present invention will be described hereinafter with reference to the accompanying drawings, in which.

DESCRIPTION OF PREFERRED EMBODIMENTS

Figure 1:
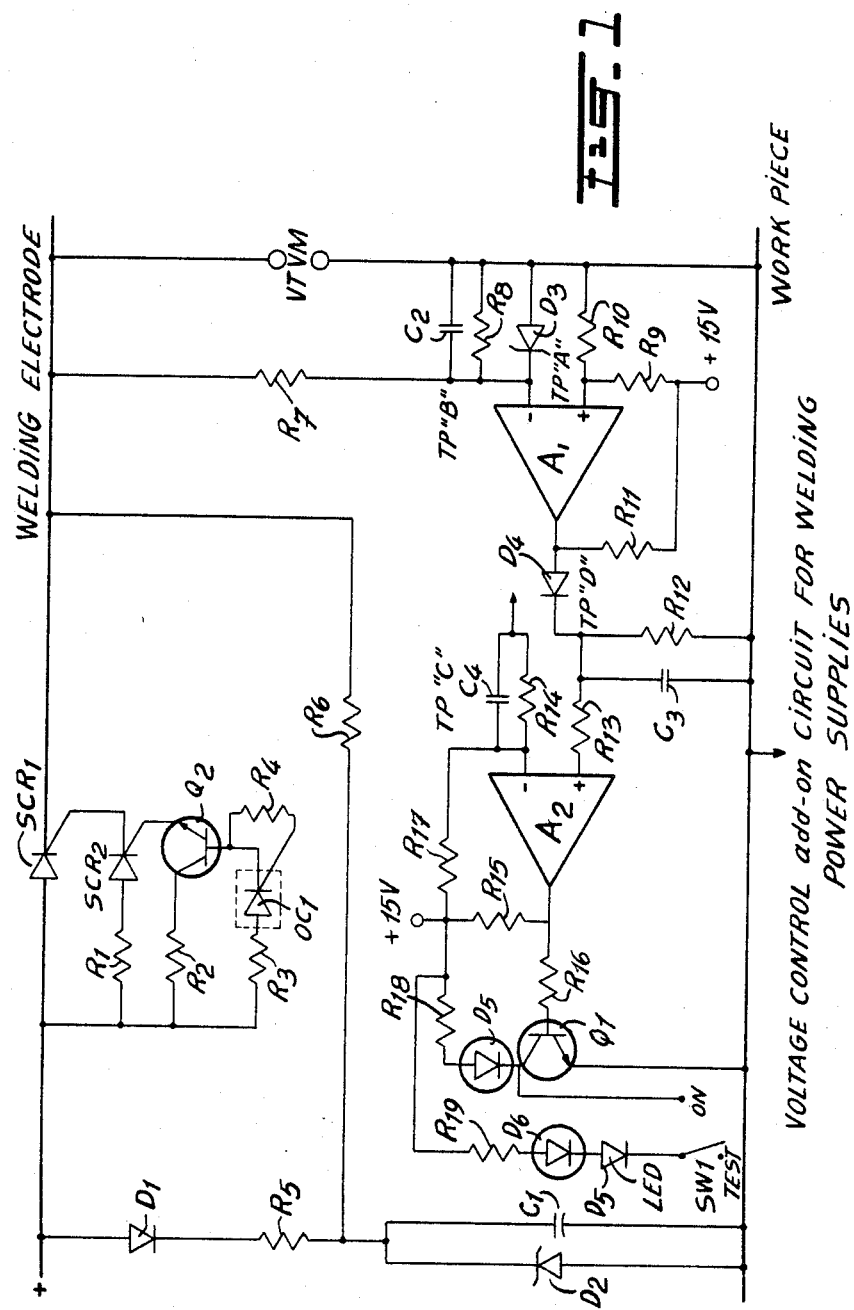
FIG. 1 is a schematic diagram showing the control circuit in accordance with the present invention where a DC power supply is used.

Before describing the various Figures of the drawings, we will describe the factors associated with the electric shock hazards encountered by welders during electric arc welding operations. Particular emphasis is placed on the factors prevailing when the welding operation is performed in damp environment.

It is well known that the intensity of the current that flows through the human body is the predominant factor which determines the severity of electric shocks. The effects of such a current may be considered more or less dangerous in accordance with its frequency and its duration, alternating currents being the most dangerous. It is generally known and accepted that an alternating current of approximately 100 mA is usually deadly, a current of about 16 mA produces a loss of control, and that the current ranging from 1 to 2 mA is considered as an acceptable pain level. That acceptable pain level is that which is to be considered the maximum permissible level of the supply control circuit of the present invention in order to avoid any unpleasant electrical shocks to welders.

The determination of the permissible voltage applicable to certain parts of the human body, as a function of the desired current level, requires a determination of the resistance of those certain parts. It is known that the minimum resistance of the human body, when the skin is wet or moist exceeds 2 k ohms (when current flows through two layers of skin), particularly due to the resistance of the skin itself. However, where the skin is partly destroyed that resistance may reach a value as low as 1 k ohm, which explains the occurrence of fatal electric shocks at a voltage of 110 volts AC. With normally wet skin, then the voltage at the electrode should not exceed 2 volts so as to avoid the application of a current higher than 1 mA.

On the other hand, from experiments made on the behaviour of the impedance between the electrode tip and the plate or a metal piece to be welded, it has been found that the resistance never falls below 6.41 k ohms whenever the flux at the electrode tip remains unbroken. However, as soon as that flux is cut off from the electrode tip, the resistance falls close to 0 ohms, at least for a short period of time, whether the metal piece is rusted or unrusted. Since it is usual for welders to frequently break the flux at the electrode tip, it is therefore noted that the latter resistance value is far from the measured value of the human skin impedance.

In the instant case, the operation principle of the circuit for controlling the power supplied to the electrode resides in continuously measuring the dynamic impedance of the electrode-workpiece assembly and, considering the skin impedance in the worst conditions, that is in damp environments. The circuit of the present invention automatically and quickly triggers a device mounted in series between the power supply and the electrode so as to eliminate or to reduce drastically electric shock hazards for welders using electric arc welding devices. To optimize safety, the impedance threshold has been set at 500 ohms since the latter value is far lower than that of the minimum resistance of the skin in damp environment, but far higher than the electrode workpiece resistance as mentioned above. The chosen value allows the conception of a circuit having a low welding starting time and which is not subjected to false startings even with slow starting type electrode and no electric shock occurs when, for example, the welder has one hand in contact with the electrode tip and the other hand is touching the plate, even if the hands are wet or moist.

Referring now to FIG. 1, there is shown an embodiment of the control circuit incorporating the basic operating principle of the present invention. It is to be noted that the control circuit may be directly incorporated into the power supply of the welding machine or be connected in series between the power supply output and the shielded welding electrode. As shown, the control circuit is connected to a DC power supply device and when actuated, serves to supply the power to the welding device. On the other hand, when not triggered, the power feeding device acts as an open switch between the electrode of the welding device and power supply to prevent any power transfer.

That power feeding device comprises an opto-coupler OC1 provided with a light emitting diode which, when conductive renders transistor Q2 operative. The transistor Q2 is connected to the gate of a silicon controlled rectifier SCR2 (a thyristor) which in turn delivers a signal to the gate of a main silicon controlled rectifier SCR1. The circuit is thus closed and the welding electrode is fed to a voltage by means of the DC power supply of the welding device. Conversely, when no current flows through the light emitting diode of the opto-coupler OC1, SCR1 and SCR2 as well as transistor Q2 are non-conductive and therefore no voltage appears at the welding electrode tip. The power feeding device is actuated when the impedance between the electrode and the workpiece is lower than a threshold impedance, the value of which has been set at 500 ohms.

On the other hand, in order to measure the actual impedance between the electrode tip and the grounded workpiece to be welded, a voltage has to be applied at the electrode tip when the power feeding device is opened. Therefore, there is provided a high impedance voltage source which is derived from the power supply of the welding device through diode D1 and resistances R5 and R6. Capacitor C1 is used to filter that voltage whereas diode D2 limits the latter to a maximum value of 12 volts. Resistance R6 serves to limit the current therethrough to a value of about 0.3 mA, which corresponds to a safe and harmless current level if it happens to flow through the human body, as explained above.

The control circuit further includes a detection device which measures the voltage applied to the electrode tip from the high impedance source and which compares that voltage to a reference voltage equivalent to that which would be measured at point TP"B" if a resistance equal to or less than 500 ohms was connected to the electrode tip. Such detector devie is made up of resistance R7, capacitor C2 connected in parallel with resistance R8 and diode D3 as well as amplifier A1 and resistances R9, R10 and R11. When the electrode tip is not positioned in contact with the workpiece, the electrode is then supplied with a voltage of 12 volts, which corresponds to a voltage of 89 mV applied across the negative input of amplifier A1 and that same voltage appears at the positive input of A1. The output of amplifier A1 is then negatively biased and thyristor SCR1 remains nonconductive. Similarly, if the welder happens to touch the electrode tip, since his skin resistance is rather high, as mentioned previously, the output of amplifier A1 will remain negative and thyristor SCR1 nonconductive. However, as soon as the electrode tip hits the workpiece, which is grounded, the resistance value decreases below 500 ohms and the output voltage from amplifier A1 becomes positive thereby actuating a driver device which feeds the light emitting diode of opto-coupler OC1 which is then turned on to fire thyristor SCR1. The starting voltage is then applied to the welding electrode to produce the required electric arc.

Diode D4, capacitor C3 and resistance R12 form a stretcher circuit for improving the firing efficiency of thyristor SCR1, which is especially useful when the electrode tip bounces against the workpiece or when a slow starting type electrode is used.

Switch SW1 is provided to check the reliability of the circuit without having to fire thyristor SCR1. At the test position, no current flows to the light emitting diode of the opto-coupler OC1 but the light emitting diode D5 is energized to indicate whether the circuit operates properly or not. At the "ON" position, the opto-coupler OC1 light emitting diode is excited when actuated by a proper voltage. On the other hand, the light emitting diode D6 merely acts as a visual light indicator.

The control circuit described above is designed for use with a welding device equipped with a DC power supply. However, it is possible to modify the control circuit to adapt it to an AC power supply. In that case, the detection device as well as the driver device do not require any modification, but the high impedance voltage source has to be slightly modified in order to have it floating with respect to the welding machine.

Figure 2:
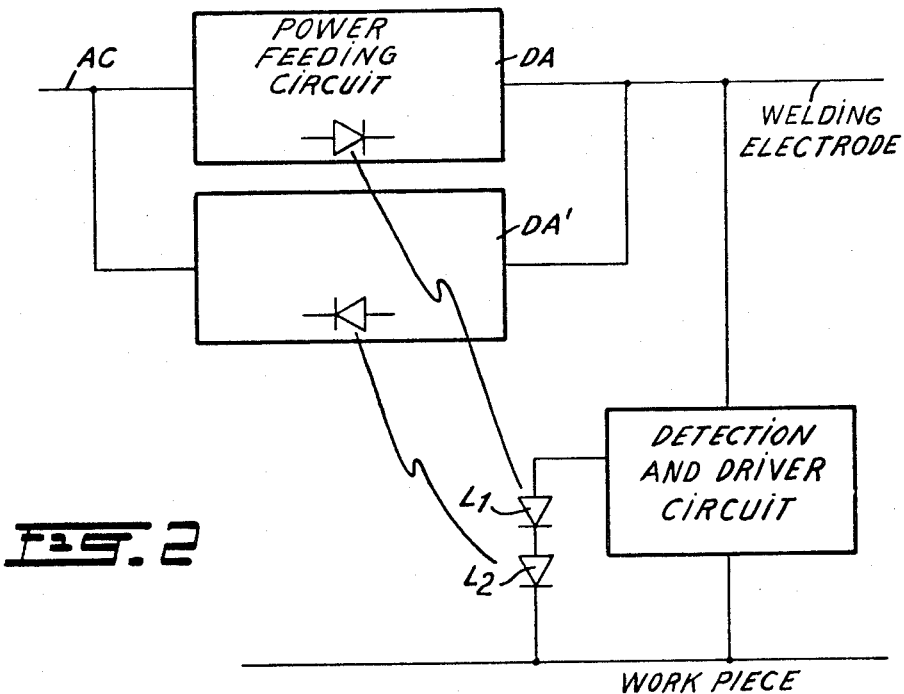
FIG. 2 is a block diagram illustrating the control circuit with an AC power supply.

FIG. 2 shows a modified circuit configuration of the power feeding circuit when used in connection with an AC power supply. In this case, a second feeding circuit DA' is added in parallel with the first feeding circuit DA, but in opposite directions since the light emitting diodes L1 and L2 of the respective opto-couplers are serially mounted.

Figure 3:
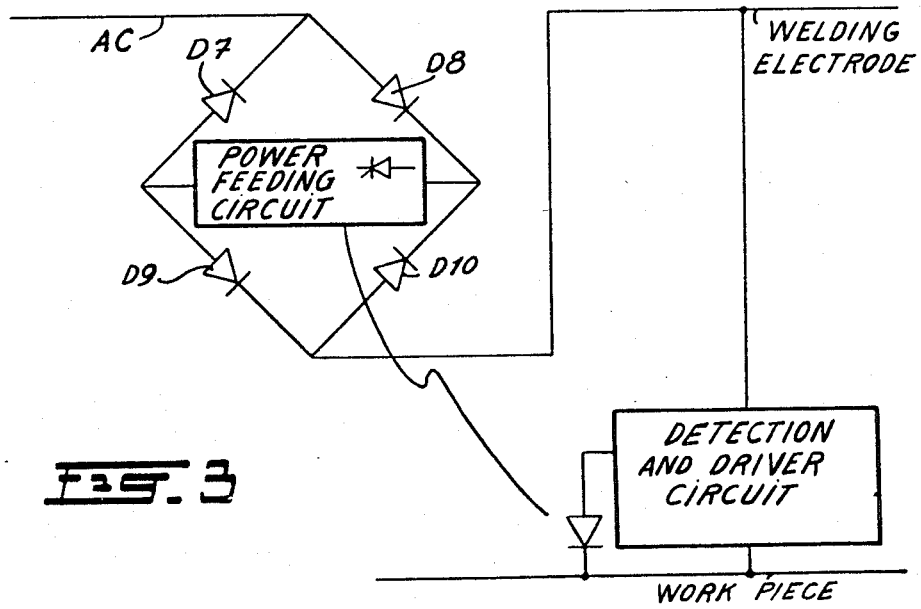
FIG. 3 is a block diagram illustrating a modified embodiment of the control circuit with an AC power supply.

FIG. 3 illustrates a first circuit configuration of the power feeding device provided with an AC power supply. In this case, the power feeding device is merely connected to each of the opposite intersection points of a diode bridge made up of diodes D7 to D10, as shown.

The above-described open voltage control circuit has been tested, particularly with shielded-type electrodes, and has demonstrated high efficiency and reliability in eliminating electric shocks to welders, particularly when the electric arc welding operation is effected in damp environments. It is understood that obvious modifications may be made to the illustrated circuits, and any such obvious modifications are considered as an integral part of the present invention provided they fall within the scope of the appended claims.

We claim:

1. A circuit for controlling the power supply to a shielded electrode of the type used in a shielded metal arc welding process (SMAW) whereby to protect a user from electric shocks, said circuit comprising a measuring circuit for determining the dynamic impedance value between said electrode and a workpiece to be welded; and a power feeding device connected in series with said power supply and said electrode, the power feeding device being controlled by said impedance measuring devie so as to render conductive said power feeding device when the dynamic impedance value detected by said measuring device reaches a level value lower than a predetermined threshold impedance value for delivering power to said electrode, said predetermined threshold impedance value being set at about 500 ohms whereby a wet human body will not be subjected to an electrical shock when the body contacts the electrode and the workpiece simultaneously.

2. A control circuit as claimed in claim 1, wherein said power supply comprises a DC current source and said power feeding circuit includes a semi-conductor provided with a control gate, said semi-conductor being directly connected between said power supply and said welding electrode, said semi-conductor being rendered conductive by a signal on said control gate initiated by said measuring circuit.

3. A control circuit as claimed in claim 2, wherein said semi-conductor is a power thyristor.

4. A control circuit as claimed in claim 2, wherein said measuring circuit includes a firing circuit for said semi-conductor gate.

5. A control circuit as claimed in claim 4, wherein said firing circuit is controlled by said measuring circuit and includes a driver device for the firing circuit for firing same when the impedance between said electrode and said workpiece is below said threshold impedance.

6. A control circuit as claimed in claim 5, wherein said firing circuit includes an opto-coupler element provided with a light emitting diode, said firing circuit becoming operative when a current generated by said driver circuit of said measuring circuit flows through said diode.

7. A control circuit as claimed in claim 6, wherein said measuring circuit includes a pulse stretcher for maintaining actuated said driver device of said firing circuit when the measured impedance between the electrode and the workpiece is lower than said threshold impedance so as to start the electric arc when a slow starting electrode is used.

8. A control circuit as claimed in claim 1, wherein said measuring circuit includes a high impedance voltage source applying a low voltage to the electrode tip when in open circuit, said applied low voltage being lower than that necessary to cause an electric shock to a user of said electrode.

9. A control circuit as claimed in claim 1, wherein said power supply comprises an AC current source and wherein there are two of said power feeding device connected in parallel, each power feeding device having a semi-conductor, said semi-conductor of one of said device being mounted in an opposite direction to the other semi-conductor, each semi-conductor having a control gate and rendered conductive by a signal applied to said gate by said measuring circuit.

10. A control circuit as claimed in claim 9, wherein said semi-conductors are power thyristors.

11. A control circuit as claimed in claim 9, wherein each semi-conductor of the power feeding device includes a circuit for respectively firing the gate electrode.

12. A control circuit as claimed in claim 11, wherein the firing circuits are controlled by means of a driver circuit incorporated in said measuring circuit for firing the respective gate control electrodes when the impedance between said electrode and the workpiece is lower than said threshold impedance.

13. A control circuit as claimed in claim 12, wherein each firing circuit includes an opto-coupler element having a light emitting diode, each firing circuit becoming operative when a current is generated by said driver circuit flowing through their respective diode.

14. A circuit for controlling the power supplied to a shielded electrode of the type as used in shielded metal arc welding process (SMAW) whereby to protect a user from electric shocks, said circuit comprising a high impedance voltage source applied to said electrode; a detection circuit for determining the dynamic impedance value existing between said electrode and a workpiece for comparing said impedance to a predetermined threshold impedance value and for generating a control signal when the detected impedance is lower than said threshold impedance; a driver circuit operative upon receiving said control signal, a power feeding device including at least one thyristor and mounted in series between said power supply and said electrode, said thyristor being fired by said driver circuit when the latter is energized, said predetermined threshold impedance value being set at about 500 ohms whereby a wet human body will not be subjected to an electrical shock by contacting the electrode and the workpiece simultaneously.

15. A control circuit as claimed in claim 14, wherein the power supply comprises a DC source and wherein said power feeding device includes a firing circuit incorporating an opto-coupler element provided with a light emitting diode, said diode rendering operative the opto-coupler element for firing the thyristor when a current generated from said driver circuit is applied thereacross.

16. A control circuit as claimed in claim 14, wherein said power supply comprises an AC source and wherein said power feeding device includes two thyristors mounted in opposite directions, each thyristor being respectively connected to a firing circuit energized by said driver circuit.

* * * * *